United States Patent [19]
Martin

[11] Patent Number: 6,116,386
[45] Date of Patent: Sep. 12, 2000

[54] DIVIDED BRAKE DISK FOR THERMAL COMPENSATION

[75] Inventor: Roland Martin, Weissach, Germany

[73] Assignee: Dr. Ing. h.c.F. Porsche AG, Weissach, Germany

[21] Appl. No.: 09/099,938

[22] Filed: Jun. 19, 1998

[30] Foreign Application Priority Data

Jun. 27, 1997 [DE] Germany .................... 197 27 333

[51] Int. Cl.$^7$ ................................. F16D 65/12
[52] U.S. Cl. ................. 188/218 XL; 188/73.2
[58] Field of Search ............... 188/218 XL, 218 A, 188/73.2, 366, 264 G, 250 B, 250 G; 301/6.8; 403/372, 365

[56] References Cited

U.S. PATENT DOCUMENTS

| | | | |
|---|---|---|---|
| 3,962,843 | 6/1976 | King, Jr. ..................... | 403/372 |
| 3,978,945 | 9/1976 | Gardner et al. ............. | 188/218 XL |
| 4,102,443 | 7/1978 | Kohler et al. .............. | 188/218 XL |
| 4,280,598 | 7/1981 | Pöllinger ..................... | 188/218 XL |
| 4,281,745 | 8/1981 | Wirth .......................... | 188/218 XL |
| 4,645,041 | 2/1987 | Bass ............................ | 188/218 XL |
| 4,662,482 | 5/1987 | Bass ............................ | 188/218 XL |
| 4,790,683 | 12/1988 | Cramer, Jr. et al. ........ | 403/372 |
| 5,190,124 | 3/1993 | Haneda ....................... | 188/218 A |
| 5,520,269 | 5/1996 | Yamamoto et al. ........ | 188/218 XL |

FOREIGN PATENT DOCUMENTS

| | | |
|---|---|---|
| 0 127 932 A1 | 12/1984 | European Pat. Off. . |
| 1 244 834 | 7/1967 | Germany . |
| 1 267 473 | 5/1968 | Germany . |
| 82 16 237 U | 9/1982 | Germany . |
| 42 11 868 A1 | 10/1993 | Germany . |
| 44 46 017 A1 | 7/1996 | Germany . |
| 196 17 154 A1 | 11/1997 | Germany . |

OTHER PUBLICATIONS

Burckhardt, M; Fahrwerktechnik: Bremsdynamik und Pkw-Bremsanlagen; 1$^{st}$ Edition; 1991, 10 pages.

*Primary Examiner*—Douglas C. Butler
*Attorney, Agent, or Firm*—Evenson, McKeown, Edwards & Lenahan, P.L.L.C.

[57] ABSTRACT

A brake disk, particularly a ventilated brake disk, has at least one friction ring connected with a brake disk chamber by fastening screws. Each fastening screw is provided with a cylindrical projection which is adjoined on the end side by a threaded portion. The cylindrical projection of the fastening screw is arranged in a bore of the friction ring. The threaded portion of the screw can be screwed into the brake chamber.

8 Claims, 1 Drawing Sheet

DIVIDED BRAKE DISK FOR THERMAL COMPENSATION

BACKGROUND OF THE INVENTION

This application claims the priority of German application 197 27 333.5, filed Jun. 27, 1997, the disclosure of which is expressly incorporated by reference herein.

The present invention relates to a brake disk, and more particularly, to a ventilated brake disk having at least one friction ring which is connected with a brake disk chamber by fastening screws.

DE 44 46 017 A1 shows a ventilated brake disk which has a two-part construction and consists of a brake chamber as well as the friction rings. The friction rings are connected with the brake chamber by screws arranged in a flange sleeve. A flange is supported on the chamber, and the screw head is supported on the friction disks. A cup spring is arranged between the flange sleeve and the screw head.

SUMMARY OF THE INVENTION

An object of the present invention is to provide an improved brake disk divided into two parts which can be connected by bolts and, in addition to an axial damping, ensures a compensation of thermal tensions.

According to the present invention, this object has been achieved by providing fastening screws each having a cylindrical projection with an end-side threaded portion. The cylindrical projection is arranged in a bore of the friction ring, with the threaded portion being screwable into the brake disk chamber.

Principal advantages achieved with the present invention are that, because of the interposition of a cup spring with the interaction and coordination of a damping element between the brake parts, an additionally defined high axial damping is achievable. A basic damping is achieved mainly by way of the cup spring.

The cup spring permits defined prestressing and compensation of thermal tensions between the two brake parts. A fastening screw is disposed in a corrugated sleeve so that a radial play compensation can also take place. In particular, a temperature-caused expansion is compensated by this corrugated sleeve because the brake chamber is relatively cold and the friction disks are relatively hot.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
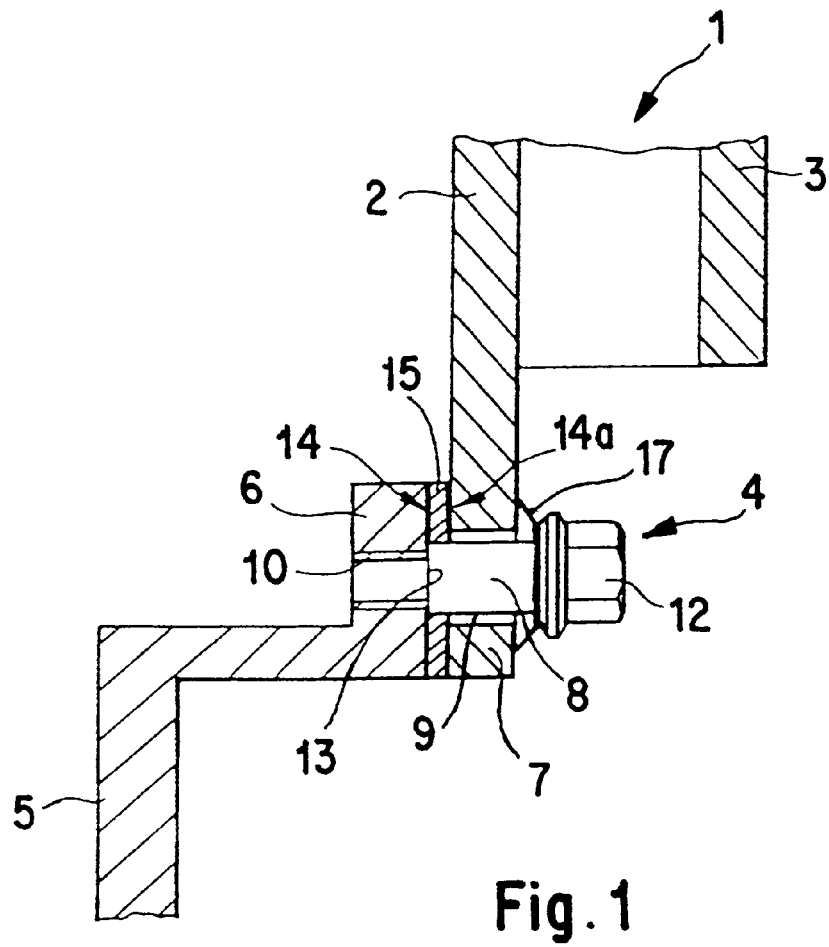
FIG. 1 is a cross-sectional view of a section of a brake disk and of a connection by way of a fastening screw.

A brake disk 1 of a disk brake comprises essentially two friction rings 2, 3 which are ventilated and are connected with a brake chamber 5 by fastening screws 4, only one of which need to be shown. The connection of the brake chamber 5 with the brake disk 1 takes place by fastening rings 6, 7 of the brake chamber and of the friction ring 2.

The fastening screw 4 has a cylindrical projection 8 which is arranged in the area of a bore 9 in the fastening ring 7. Adjoining the projection 8 of the fastening screw 4, a threaded section 10 is provided on the end side of the screw and can be screwed into a thread of the fastening ring 6 of the brake chamber 5. The screw head 12 is arranged opposite the threaded section 10 of the fastening screw.

With the interposition of a spring element, such as a cup spring 17, the screw head 12 is supported on the fastening ring 7 of the friction ring 2. Furthermore, a step 13 of the cylindrical projection 8 is supported on the interior surface 14 of the fastening ring 6.

Figure 2:
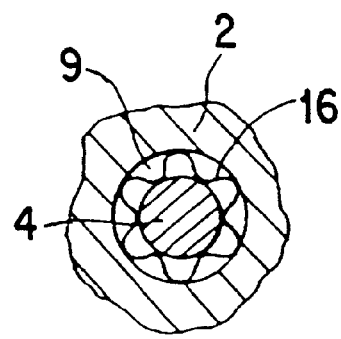
FIG. 2 is a cross-sectional view of a fastening screw held in corrugated tube.

A damping element 15, for example, an elastically coated metal damping sheet, is arranged between the opposite interior surfaces 14, 14a of the fastening rings 6, 7 of the chamber 5 and of the friction ring 2. The cylindrical projection 8 of the fastening screw 4 may be disposed inside the bore 9 in a corrugated sheet metal sleeve 16, as shown in detail particularly by FIG. 2.

In FIG. 1, the screw head 12 is arranged on the interior side of the brake disk 1. The same effect can be obtained, however, when the screw head 12 with the cup spring 17 is arranged on the brake chamber 5 and the threaded section 10 of the screw 4 is fixed in the fastening ring 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Brake disk comprising at least one friction ring, a brake disk chamber and fastening screws for connecting the friction ring and brake disk chambers, wherein each of the fastening screws has a cylindrical projection with an end-side threaded portion, the cylindrical projection is arranged in a bore of the friction ring, and the threaded portion is screwable into the brake disk chamber, the cylindrical protection being configured to protrude beyond the bore with a face of the projection protruding beyond the bore forming a stop.

2. Brake disk according to claim 1, wherein a screw head is arranged on an interior side of the friction ring and is supported thereat by a cup spring.

3. Brake disk according to claim 1, wherein a damping element is arranged between opposite contact surfaces of the brake disk chamber and of the friction ring.

4. Brake disk according to claim 3, wherein a screw head is arranged on an interior side of the friction ring and is supported thereat by a cup spring.

5. Brake disk according to claim 1, wherein the cylindrical projection is arranged in a corrugated sleeve.

6. Brake disk according to claim 5, wherein a screw head is arranged on an interior side of the friction ring and is supported thereat by a cup spring.

7. Brake disk according to claim 6, wherein a damping element is arranged between opposite contact surfaces of the brake disk chamber and of the friction ring.

8. Brake disk according to claim 1, wherein the cylindrical projection is intermediate to end faces of the fastening screws and the face of the projection forming the stop is spaced from a free end of each of the fastening screws.

* * * * *